United States Patent
Hue et al.

(10) Patent No.: US 10,073,275 B2
(45) Date of Patent: Sep. 11, 2018

(54) ANTI-GLARE 3D GLASSES

(71) Applicant: Valeo Vision, Bobigny (FR)

(72) Inventors: David Hue, Butry sur Oise (FR); Benoist Fleury, Vincennes (FR)

(73) Assignee: VALEO VISION, Bobigny (FR)

( * ) Notice: Subject to any disclaimer, the term of this patent is extended or adjusted under 35 U.S.C. 154(b) by 168 days.

(21) Appl. No.: 14/916,300

(22) PCT Filed: Sep. 25, 2014

(86) PCT No.: PCT/EP2014/070519
§ 371 (c)(1),
(2) Date: Mar. 3, 2016

(87) PCT Pub. No.: WO2015/044286
PCT Pub. Date: Apr. 2, 2015

(65) Prior Publication Data
US 2016/0209666 A1    Jul. 21, 2016

(30) Foreign Application Priority Data
Sep. 26, 2013   (FR) ..................... 13 59259

(51) Int. Cl.
| G11B 27/34 | (2006.01) |
| G02B 27/22 | (2018.01) |
| G02B 27/26 | (2006.01) |
| G02C 7/10 | (2006.01) |
| G02B 26/02 | (2006.01) |
| G02F 1/13 | (2006.01) |
| H04N 13/04 | (2006.01) |

(52) U.S. Cl.
CPC ......... *G02B 27/2264* (2013.01); *G02B 26/02* (2013.01); *G02B 27/26* (2013.01); *G02C 7/101* (2013.01); *G02F 1/1313* (2013.01); *H04N 13/0438* (2013.01)

(58) Field of Classification Search
CPC .... G02B 27/2264; G02B 26/02; G02B 27/26; G02C 7/101; H04N 13/0438
See application file for complete search history.

(56) References Cited

U.S. PATENT DOCUMENTS

| 3,199,114 A | 8/1965 | Malifaud |
| 3,961,181 A | 6/1976 | Golden |
| 4,286,308 A | 8/1981 | Wolff |

(Continued)

FOREIGN PATENT DOCUMENTS

| CN | 301804989 | 1/2012 |
| CN | 102707456 A | 10/2012 |

(Continued)

*Primary Examiner* — Mishawn Hunter
(74) *Attorney, Agent, or Firm* — Oblon, McClelland, Maier & Neustadt, L.L.P.

(57) ABSTRACT

A pair of glasses equipped with two lenses and intended to be worn by a user, the lenses each comprising a screen capable of transmitting or occulting, at least partially, incident light intended to pass through the lenses toward the user, the glasses being configured to, in a first occulting mode, attenuate the intensity of the incident light by simultaneously occulting the two screens, and, in a second occulting mode, enable three-dimensional vision of data emitted by a display device, via alternated occultation of the two screens.

20 Claims, 1 Drawing Sheet

(56) References Cited

U.S. PATENT DOCUMENTS

Figure 1:
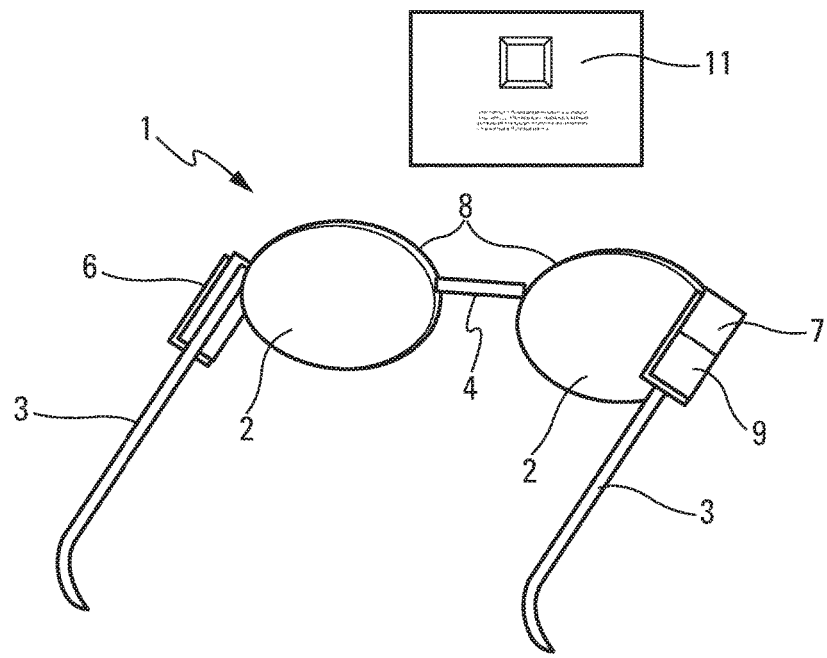

| | | |
|---|---|---|
| 4,311,368 A | 1/1982 | Saito et al. |
| 4,848,890 A | 7/1989 | Horn |
| 5,258,607 A | 11/1993 | Agostini et al. |
| 5,276,539 A | 1/1994 | Humphrey |
| 5,486,938 A | 1/1996 | Aigrain |
| 5,671,035 A | 9/1997 | Barnes |
| 5,835,458 A | 11/1998 | Bischel et al. |
| 5,859,735 A | 1/1999 | De Vries |
| 5,911,018 A | 6/1999 | Bischel et al. |
| 5,978,524 A | 11/1999 | Bischel et al. |
| 6,078,704 A | 6/2000 | Bischel et al. |
| 6,118,908 A | 9/2000 | Bischel et al. |
| 6,133,686 A | 10/2000 | Inoue et al. |
| 6,141,465 A | 10/2000 | Bischel et al. |
| 6,313,587 B1 | 11/2001 | MacLennan et al. |
| 6,384,982 B1 | 5/2002 | Spitzer |
| 6,424,448 B1 | 7/2002 | Levy |
| 6,493,128 B1 | 12/2002 | Agrawal et al. |
| 6,522,794 B1 | 2/2003 | Bischel et al. |
| 6,557,995 B1 | 5/2003 | Edwards |
| 6,568,738 B1 | 5/2003 | Braun |
| 6,624,564 B2 | 9/2003 | Wang et al. |
| 6,626,532 B1 | 9/2003 | Nishioka et al. |
| 6,928,180 B2 | 8/2005 | Stam et al. |
| 7,134,707 B2 | 11/2006 | Isaac |
| 7,684,105 B2 | 3/2010 | Lamontagne et al. |
| 7,751,122 B2 | 7/2010 | Amitai |
| 7,874,666 B2 | 1/2011 | Xu et al. |
| 7,893,890 B2 | 2/2011 | Kelly et al. |
| 7,970,172 B1 | 6/2011 | Hendrickson |
| 8,197,931 B2 | 6/2012 | Ueda et al. |
| 8,208,504 B2 | 6/2012 | Dantus et al. |
| 8,233,102 B2 | 7/2012 | Burlingame et al. |
| D665,009 S | 8/2012 | Nibauer et al. |
| D717,865 S | 11/2014 | Votel et al. |
| 8,964,298 B2 | 2/2015 | Haddick et al. |
| 8,976,084 B2 | 3/2015 | Hamdani et al. |
| D734,808 S | 7/2015 | Markovitz et al. |
| 9,087,471 B2 | 7/2015 | Miao |
| D735,799 S | 8/2015 | Markovitz et al. |
| 9,186,963 B2 | 11/2015 | Tewari et al. |
| D746,362 S | 12/2015 | Markovitz et al. |
| D747,403 S | 1/2016 | Markovitz et al. |
| 9,277,159 B2 | 3/2016 | Shin et al. |
| D763,944 S | 8/2016 | Shin |
| D765,761 S | 9/2016 | Votel et al. |
| D769,358 S | 10/2016 | Markovitz et al. |
| D769,362 S | 10/2016 | Markovitz et al. |
| D769,962 S | 10/2016 | Markovitz et al. |
| 9,511,650 B2 | 12/2016 | Momot |
| 2002/0175615 A1 | 11/2002 | Wang et al. |
| 2004/0252516 A1* | 12/2004 | Brun .................. B60Q 1/0011 362/465 |
| 2006/0140502 A1 | 6/2006 | Tseng et al. |
| 2006/0175859 A1 | 8/2006 | Isaac |
| 2007/0285759 A1 | 12/2007 | Ash et al. |
| 2008/0186604 A1 | 8/2008 | Amitai |
| 2008/0218434 A1 | 9/2008 | Kelly et al. |
| 2009/0213282 A1 | 8/2009 | Burlingame et al. |
| 2009/0213283 A1 | 8/2009 | Burlingame et al. |
| 2010/0065721 A1 | 3/2010 | Broude et al. |
| 2010/0161177 A1 | 6/2010 | Yuter |
| 2010/0194857 A1 | 8/2010 | Mentz et al. |
| 2011/0072961 A1 | 3/2011 | Jungkuist et al. |
| 2011/0233384 A1 | 9/2011 | Wu et al. |
| 2011/0288725 A1 | 11/2011 | Yuter |
| 2012/0019891 A1 | 1/2012 | Dewell |
| 2012/0026071 A1 | 2/2012 | Hamdani et al. |
| 2012/0044560 A9 | 2/2012 | Lam et al. |
| 2012/0126099 A1 | 5/2012 | Tewari et al. |
| 2012/0180204 A1 | 7/2012 | Hawkins |
| 2012/0303214 A1 | 11/2012 | Yuter |
| 2013/0113973 A1 | 5/2013 | Miao |
| 2013/0127980 A1 | 5/2013 | Haddick et al. |
| 2013/0286163 A1* | 10/2013 | Dror .................. H04N 13/0429 348/47 |
| 2013/0300911 A1 | 11/2013 | Beckman |
| 2014/0022219 A1* | 1/2014 | Kim .................. G02B 27/2214 345/204 |
| 2014/0109302 A1 | 4/2014 | Casbi et al. |
| 2014/0153076 A1 | 6/2014 | Tewari et al. |
| 2014/0253816 A1 | 9/2014 | Shin et al. |
| 2015/0062469 A1 | 3/2015 | Fleury |
| 2015/0077826 A1 | 3/2015 | Beckman |
| 2016/0077400 A1 | 3/2016 | Lam et al. |
| 2016/0214467 A1 | 7/2016 | El Idrissi et al. |
| 2016/0216536 A1 | 7/2016 | Hue et al. |
| 2016/0223816 A1 | 8/2016 | Hue et al. |
| 2016/0357014 A1 | 12/2016 | Beckman |
| 2017/0023802 A1 | 1/2017 | El Idrissi et al. |

FOREIGN PATENT DOCUMENTS

| | | |
|---|---|---|
| DE | 2001086 A1 | 7/1971 |
| DE | 3836095 A1 | 4/1990 |
| DE | 102012008913 A1 | 11/2012 |
| EP | 0341519 A2 | 11/1989 |
| EP | 0459433 A1 | 12/1991 |
| EP | 0498143 A1 | 8/1992 |
| EP | 0945303 A1 | 9/1999 |
| FR | 2684770 A1 | 6/1993 |
| FR | 2693562 A1 | 1/1994 |
| FR | 2722581 A1 | 1/1996 |
| FR | 2781289 A1 | 1/2000 |
| FR | 2846756 A1 | 5/2004 |
| FR | 2941786 A1 | 8/2010 |
| FR | 2975792 A1 | 11/2012 |
| FR | 2976089 A1 | 12/2012 |
| FR | 2988493 A1 | 9/2013 |
| FR | 3010941 A1 | 3/2015 |
| FR | 3011091 A1 | 3/2015 |
| GB | 2420183 A | 5/2006 |
| GB | 2445365 A | 7/2008 |
| JP | 2004233908 A | 8/2004 |
| WO | 9210130 A1 | 6/1992 |
| WO | 9214625 A1 | 9/1992 |
| WO | 9512502 A1 | 5/1995 |
| WO | 9620846 A1 | 7/1996 |
| WO | 9827452 A1 | 6/1998 |
| WO | 2012036638 A1 | 3/2012 |
| WO | 2012115301 A1 | 8/2012 |

* cited by examiner

ANTI-GLARE 3D GLASSES

CROSS-REFERENCE TO RELATED APPLICATIONS

This application is the U.S. National Phase application of PCT Application No. PCT/EP2014/070519 filed Sep. 25, 2014, which claims priority to the French application 1359259 filed on Sep. 26, 2013, which applications are incorporated herein by reference and made a part hereof.

BACKGROUND OF THE INVENTION

1. Field of the Invention

The present invention relates to anti-dazzle 3D glasses.

2. Description of the Related Art

In the field of portable optical devices equipped with technologies related to communicating data and informing, glasses enabling three-dimensional vision of data are known. The images are emitted by a display device toward a user wearing the glasses.

To obtain a three-dimensional image, one known technology consists in alternately emitting the images intended for each eye. Simultaneously, the lenses of the glasses include screens that occult the images that are not intended therefor. Thus, each eye receives a different image so as to enable a three dimensional image to be reconstructed. The alternation of the data and occultation is carried out at frequencies that are not to be perceptible by the user.

Glasses with polarized lenses that filter images emitted with specific wavelengths, thereby differentiating between them so that each eye receives an image that is intended therefor, also exist. Thus, each eye perceives a different image, whereas the display device simultaneously emits the images for both eyes. However, this technology requires certain types of TV screens, in contrast to the alternation technology that functions with screens not requiring such a complexity.

Furthermore, glasses in other technologies allow the incident light that is intended to pass through the lens to the user to be attenuated, in order to avoid the risk of dazzle, such as sunglasses.

To avoid multiplying the number of pairs of glasses, and to avoid the need to change them on each occasion, it is advantageous to have a single pair providing both functions, and thus to be able to use them not only to see three-dimensional images, but also to attenuate light in case of glare.

Document CN 102 707 456 describes a pair of glasses capable of providing both functions, with reversible lenses. On one side the lenses serve for three-dimensional vision, and by flipping them onto the other side, the lenses serve as sunglasses. To this end, the lenses include a polarization filter on one face and a quarter-wave plate on the other face of the lens.

Nevertheless, this solution requires the glasses to be manipulated.

SUMMARY OF THE INVENTION

The aim of the invention is to remedy this drawback, and proposes to this end a pair of glasses equipped with two lenses and intended to be worn by a user, the lenses each comprising a screen capable of transmitting or occulting, at least partially, incident light intended to pass through the lens toward the user, the glasses being configured to, in a first occulting mode, attenuate the intensity of the incident light by simultaneously occulting the two screens, and, in a second occulting mode, enable three-dimensional vision of data emitted by a display device, via alternated occultation of the two screens.

Thus, it is enough to change the occulting mode in order to pass from a pair of glasses usable for three-dimensional vision, to a pair of glasses configured to attenuate luminosity. It is not necessary to carry out complex manipulations of the lenses or of the frame.

According to various embodiments of the invention, which may be used together or separately:

the glasses are configured to, in the first occulting mode, alternately occult each screen in synchronization with the alternated emission of data intended for each eye, especially at a frequency corresponding to the alternation frequency of the emission of the data;

in the second occulting mode, the simultaneous occultation of the two screens is carried out at a preset frequency, function of a transmission coefficient of the screens;

the transmission coefficient is variable;

the glasses are configured to adapt the transmission coefficient of the anti-dazzle screen depending on the intensity of the incident light;

the transmission coefficient is set by pulse width modulation;

the alternated occultation of the lenses is achieved by pulse width modulation;

the modulation is carried out at fixed frequency and with a variable duty cycle;

the glasses comprise means for controlling the occulting mode, in particular means for controlling the duty cycle of each screen;

the controlling means are configured to detect whether the glasses need to be used to attenuate the intensity of the incident light, or to enable three-dimensional vision;

the controlling means comprise a photometric sensor, configured to sense the frequency of a pulsed optical signal;

the glasses comprise a switch configured to select either the alternated occultation or the simultaneous occultation of the screens;

the screens are equipped with a vertical polarization layer and a horizontal polarization layer;

the screens are equipped with a liquid-crystal layer arranged between the two polarization layers;

the screens are equipped with a microelectromechanical layer.

These and other objects and advantages of the invention will be apparent from the following description, the accompanying drawings and the appended claims.

BRIEF DESCRIPTION OF THE ACCOMPANYING DRAWINGS

Figure 2:
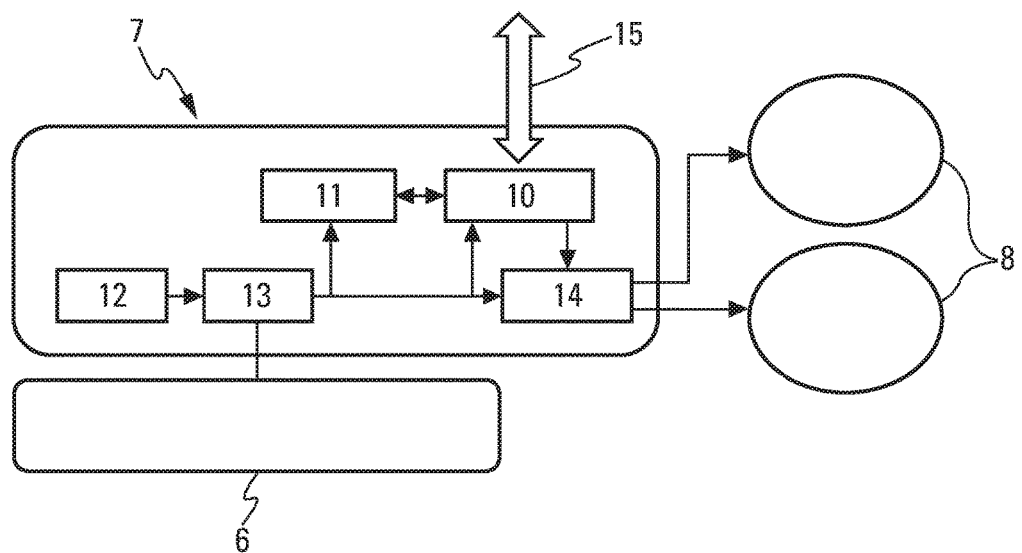

The invention will be better understood in light of the following merely indicative nonlimiting description, which is accompanied by the appended drawings, in which:

FIG. 1 schematically illustrates a perspective view of a pair of anti-dazzle 3D glasses according to the invention; and FIG. 2 schematically illustrates the operation of a control or controlling means in one embodiment of the glasses according to invention.

DETAILED DESCRIPTION OF THE PREFERRED EMBODIMENTS

As illustrated in FIG. 1, the glasses 1 according to the invention have here two lenses 2, two temples 3 and a frame 4 in which the lenses 2 are fixed. In the description of the invention, the term lens designates the object fixed to the frame 4 and through which the wearer of the glasses 1 sees the scene that is in front of him. The lens 2 may be manufactured from an organic or mineral glass material for example but also from any other material known to those skilled in the art to this end.

The eyes of the wearer of the glasses 1 are located on a first side of the lenses 2, and the scene that he observes is located on a second side of the lenses 2. Thus, the incident light striking the lenses 2 comes from the second side and then passes through them via the exterior face of the lenses 2, and exits via the interior face toward the wearer of the glasses 1.

The lenses 2 furthermore each include a screen 8 capable of transmitting or occulting at least partially the incident light. By virtue of these screens 8, the lenses 1 are configured to, in a first occulting mode, attenuate the intensity of the incident light, and in a second occulting mode, enable three-dimensional vision of data emitted by a display device 11, such as a TV screen.

In the first mode, the attenuation of the intensity of the incident light is achieved by simultaneous occultation of the two screens 8 at a preset frequency, which generates, by averaging, a coefficient of transmission of the incident light through the glasses 1.

The transmission coefficient is set, for example, by pulse width modulation. The modulation is carried out at fixed frequency, preferably at least 100 Hz, and with a duty cycle defining the transmission coefficient of the screen 8.

A screen 8 therefore has a coefficient of transmission of the light that varies periodically between:
- a maximum value, for which the transparency is maximum during a time t1; and
- a minimum value, for which the transparency is minimum during a time t2.

A duty cycle α is defined by the ratio of the duration t1 during which the transmission is maximum, and the duration T of the period, and therefore varies from 0 to 100%:

$$\alpha = \frac{t_1}{T}$$

By modifying the duty cycle α, the time t1 during which the transparency is maximum is lengthened or shortened, relative to the time t2 during which light does not pass. Thus, by increasing t1, the duty cycle α increases, and by increasing t2, the duty cycle α decreases. The average value of the transmission coefficient is thus dependent on the value of the duty cycle α. The duty cycle α is variable and chosen depending on the light intensity of the incident light.

The scene located in front of the wearer of the glasses 1 is therefore visible only during a fraction of time equal to the duty cycle α. The luminosity seen through the variable-transmission screen 8 is therefore decreased relative to the actual luminosity by a factor equal to α.

Furthermore, the glasses 1 may be configured to adapt the transmission coefficient of the screen 8 depending on the intensity of the incident light. The glasses 1 thus make it possible to protect the user in a substantially equal way whatever the intensity of the incident light.

In a second occulting mode, the glasses 1 enable three-dimensional vision of data emitted by a display device 11, via alternated occultation of the two screens 8. The display device 11 alternately displays two images at a frequency imperceptible to the user, each image being intended for one of the two eyes of the user. The two images are configured to allow the user to form a single three-dimensional image.

Concomitantly, the screens 8 alternately let pass light so that each eye receives the image that is intended therefor. To this end, the occultation of each screen 8 is coupled to the alternated emission of data intended for each eye, at a frequency corresponding to the alternation frequency of the data emission by the display device 11.

Similarly to the first mode, the alternated occultation of each lens 2 by the screens 8 is achieved by pulse width modulation, the modulation being carried out at fixed frequency and with a variable duty cycle α.

For both modes, the glasses 1 advantageously comprise a control or controlling means 7 for controlling the occulting mode and the duty cycle α of each screen 8. Thus, the duty cycle α is variable and preferably chosen depending on the light intensity of the incident light for the first mode and depending on the frequency of the alternation of data displayed by the display device or means 11 in the second mode. The control or controlling means 7 are powered by a battery 6.

In a first embodiment, the glasses 1 comprise a switch 9 configured to select either the alternated occultation or the simultaneous occultation of the screens 8. The switch 9 modifies the control parameters of the screens 8 in order to pass from an alternated occultation mode to a simultaneous occultation mode, and vice versa. For example, for a simultaneous occultation mode, the screens 8 occult the incident light at a frequency of 250 Hz, in order to lower the incident light. In an alternated mode, the screens 8 alternately occult the incident light, for example at a frequency of 72 Hz, this corresponding to the data display frequency of certain 3D display devices or means 11.

In a second embodiment, which will possibly be combined with the preceding one, the control or controlling means 7 are configured to detect whether the glasses 1 need to be used to attenuate the intensity of incident light, or to enable three-dimensional vision. To do this, the control or controlling means 7 comprise, for example, a photometric sensor in order to sense the frequency of a pulsed optical signal. Thus, if the sensor receives a signal corresponding to a three-dimensional vision signal emitted by displaying means 11, the control or controlling means 7 command alternated occultation of the screens 8. In contrast, if the sensor receives unpulsed incident light, or incident light pulsed in a different frequency range, the control or controlling means 7 command simultaneous occultation of the screens 8, in order to attenuate the luminosity for the user.

The controlling means 7 may also comprise wireless connection means, in order to receive remotely information on the operating mode to choose. For example, a 3D TV screen transmits a signal to the controlling means 7 in order to choose the three-dimensional mode.

In a first embodiment, the screens 8 are equipped with a vertical polarization layer and a horizontal polarization layer, which layers are placed on the lenses 2, and a liquid-crystal layer arranged between the two polarization layers. The polarization layers each polarize the incident light in a different direction. In the liquid-crystal layer, the direction of the polarized light is modified by the liquid crystals. The orientation of the liquid crystals determines the polarization direction of the light. Thus, when they are orientated in a direction that modifies the polarization to the same direction as that of the following polarization layer, the light passes through. In contrast, if the direction is different, the light is not transmitted to the wearer of the glasses 1.

The modulation is carried out by orienting the liquid crystals in the same direction as that of the following polarization layer during the time t1, in order to transmit the light, then by orienting it in a different direction during the time t2, in order to block the light.

In a second embodiment, the screens 8 are equipped with a MEMS-type microelectromechanical layer (MEMS standing for microelectromechanical system) placed on the lenses 2. This layer is composed of electrically actuatable microelectronic elements that block or let pass the incident light. The microelectromechanical systems are for example of the type described in U.S. Pat. No. 7,684,105. Here, the modulation is carried out by letting pass the incident light during the time t1, and by blocking it during the time t2, by actuation of the microelectromechanical layer.

In FIG. 2, the control or controlling means 7 are shown according to one embodiment in which the glasses 1 receive information over a wireless link. The control or controlling means 7 comprise a charger 13 powered by the battery 6, and a connector 12 for the case where the glasses 1 need to be plugged in with an electrical supply cable, especially to recharge the battery 6. The charger 13 powers the other components of the control or controlling means 7.

Furthermore, the control or controlling means 7 comprise an electronic Bluetooth telecommunications chip 10 that receives information 15 serving to determine the occulting mode of the glasses 1, or even information on the ambient luminosity. The chip 10 is clocked by a quartz electronic clock or displaying means 11, and transmits data on the mode and occulting frequency of the screens 8 to a control unit 14. These data allow the glasses 1 to be used either in a three-dimensional vision mode, or in a mode attenuating the intensity of incident light.

Thus, the control unit 14 controls the occultation of each screen 8 so that they simultaneously or alternately block the light at a preset frequency corresponding to the operating mode of the glasses 1.

In a specific application, the glasses 1 are used as a device for assisting with driving an automotive vehicle. This application is given by way of example and application of the glasses 1 of the invention is not limited to this example.

Specifically, when it is sunny, especially at the end of the day when the height of the sun above the horizon is low, the road scene in front of a vehicle is brightly illuminated. The driver therefore runs the risk not only of being dazzled, but also of not being able to distinguish details in this road scene that are important for his safety, for example road signs warning of a nearby source of danger, or the state of the road surface over which he is driving. The same goes for nighttime driving, during which the driver may be dazzled by the lights of other vehicles. Dazzle may also be substantial at night, when vehicles driving in the opposite direction are met with their lights on and pointing in the direction of the driver.

The glasses 1 then serve to protect the driver and/or passengers who are wearing them against any form of dazzle or substantial variation in the incident light intensity.

By virtue of the invention, the glasses 1 in addition make it possible to be able to view information displayed in three dimensions. This information is for example driving-related information such as that conventionally displayed on the dashboard. The information may be displayed in three dimensions on a head-up display (HUD) screen, or even on a screen of the dashboard.

Furthermore, 3D TV screens may be present in the passenger compartment for passengers. The glasses 1 thus allow these passengers to watch films or other videos in this format.

The invention therefore makes provision, in this application, to equip the driver and/or a passenger with a pair of adaptive glasses 1 in order to modulate the amount of light reaching his eye in a first operating mode and to also allow him to be presented with three-dimensional information in a second operating mode. Thus, a single pair of glasses 1 is enough to provide two different functions, an anti-dazzle function and a function enabling three-dimensional information to be viewed.

Another exemplary application of the glasses 1 according to the invention is envisioned for a vehicle driver driving at night—such as described in patent application FR 2 988 493, which is equivalent to U.S. Patent Application No. 2015/0062469, and the content of which is incorporated herein by reference. In this patent application, the anti-dazzle function, corresponding to the first occulting mode, is coupled to the illumination provided by the lights of the vehicle, in order to attenuate the dazzle of vehicles driving in the opposite direction, while ensuring the illumination of the road, as perceived by the driver, remains sufficient. Thus the glasses 1 may be used both when driving at night in this way and in a mode enabling three-dimensional viewing.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A pair of glasses to be worn by user, comprising:
   two lenses, each comprising a screen configured to transmit or occult, at least partially, incident light passing through said lens toward said user; and
   a controller configured to
      in a first occulting mode, attenuate an intensity of said incident light by simultaneously causing both screens to occult said incident light,
      in a second occulting mode, enable three-dimensional vision of data emitted by a display device, by causing said screens to alternate occultation, and
      shift from the first occulting mode to the second occulting mode or from the second occulting mode to the first occulting mode based on a frequency of the incident light.

2. The glasses as claimed in claim 1, wherein the controller is further configured to, in said second occulting mode, cause the screens to alternate occultation in synchronization with an alternated emission of data towards each eye, at a frequency corresponding to an alternation frequency of said alternated emission of said data.

3. The glasses as claimed in claim 2, wherein, in said second occulting mode, the controller is further configured to cause the screens to simultaneously occult the incident light a preset frequency based on a transmission coefficient of said screen.

4. The glasses as claimed in claim 3, wherein said transmission coefficient is variable.

5. The glasses as claimed in claim 4, wherein the controller is further configured to adapt said transmission coefficient of said screens depending on said intensity of said incident light.

6. The glasses as claimed in claim 1, wherein, in said first occulting mode, the controller is configured to cause the simultaneous occultation of said screens at a preset frequency based on a transmission coefficient of said screens.

7. The glasses as claimed in claim 6, wherein said transmission coefficient is variable.

8. The glasses as claimed in claim 7, wherein the controller is further configured to adapt said transmission coefficient of said screens depending on said intensity of said incident light.

9. The glasses as claimed in claim 7, wherein said transmission coefficient is set by pulse width modulation.

10. The glasses as claimed in claim 6, wherein said transmission coefficient is set by pulse width modulation.

11. The glasses as claimed in claim 10, wherein said pulse width modulation is carried out at fixed frequency and with a variable duty cycle.

12. The glasses as claimed in claim 11, wherein the controller is further configured to control said variable duty cycle of each of said screens.

13. The glasses as claimed in claim 12, wherein the controller is configured to shift to the second occulting mode when the frequency of the incident light indicates that the incident light corresponding to a three-dimensional vision signal.

14. The glasses as claimed in claim 13, further comprising a photometric sensor configured to sense the frequency of a pulsed optical signal.

15. The glasses as claimed in claim 14, wherein said screens include a liquid-crystal layer arranged between said vertical polarization layer and said horizontal polarization layer.

16. The glasses as claimed in claim 1, wherein said alternated occultation of said lenses is achieved by pulse width modulation.

17. The glasses as claimed in claim 16, wherein said pulse width modulation is carried out at fixed frequency and with a variable duty cycle.

18. The glasses as claimed in claim 1, comprising a switch configured to select either the first occulting mode or the second occulting mode.

19. The glasses as claimed in claim 1, wherein said screens include a vertical polarization layer and a horizontal polarization layer.

20. The glasses as claimed in claim 1, wherein said screens include a microelectromechanical layer.

\* \* \* \* \*